(12) United States Patent
Chung et al.

(10) Patent No.: US 12,188,546 B2
(45) Date of Patent: Jan. 7, 2025

(54) SPEED REDUCER

(71) Applicant: Delta Electronics, Inc., Taoyuan (TW)

(72) Inventors: Chi-Wen Chung, Taoyuan (TW);
En-Yi Chu, Taoyuan (TW); Hung-Wei Lin, Taoyuan (TW); Ming-Li Tsao, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 17 days.

(21) Appl. No.: 18/093,168

(22) Filed: Jan. 4, 2023

(65) Prior Publication Data

US 2023/0141065 A1    May 11, 2023

Related U.S. Application Data

(62) Division of application No. 16/585,474, filed on Sep. 27, 2019, now Pat. No. 11,578,789.

(Continued)

(30) Foreign Application Priority Data

Mar. 29, 2019    (CN) .......................... 201910250209.6

(51) Int. Cl.
*F16H 1/32*          (2006.01)
*F16H 21/18*         (2006.01)

(Continued)

(52) U.S. Cl.
CPC ........... *F16H 49/001* (2013.01); *F16H 21/18* (2013.01); *H02K 7/075* (2013.01); *H02K 7/116* (2013.01);

(Continued)

(58) Field of Classification Search
CPC .. F16H 49/001; F16H 21/18; F16H 2049/003; F16H 2057/02073; F16H 1/34;

(Continued)

(56) References Cited

U.S. PATENT DOCUMENTS 3,037,400 A * 6/1962 Sundt ........................ F16H 1/32
                                                  74/462
3,846,051 A * 11/1974 McDermott ............ F04C 2/103
                                                 418/61.3

(Continued)

FOREIGN PATENT DOCUMENTS

| CN | 201185372 Y | 1/2009 |
| CN | 104864036 A | 8/2015 |

(Continued)

*Primary Examiner* — Justin Holmes
(74) *Attorney, Agent, or Firm* — KIRTON McCONKIE; Evan R. Witt

(57) ABSTRACT

A speed reducer comprises a transmission shaft, an eccentric wheel, a first wheel assembly, a rotating wheel and a second wheel assembly. The first wheel assembly comprises a first wheel disc and at least one first roller. The at least one first roller is disposed on the inner wall of first wheel disc. The rotating wheel comprises a main body comprising an outer ring structure and a concave structure. The outer ring structure comprises at least one first tooth. The at least one first tooth is in contact with the corresponding first roller. At least one second roller is disposed within the concave structure. The second wheel assembly comprises a second wheel disc and at least one second tooth. The at least one second tooth is disposed on an outer periphery of the second wheel assembly. The at least one second tooth is in contact with the corresponding second roller.

8 Claims, 8 Drawing Sheets

Related U.S. Application Data

(60) Provisional application No. 62/756,706, filed on Nov. 7, 2018.

(51) Int. Cl.
- *F16H 49/00* (2006.01)
- *H02K 7/075* (2006.01)
- *H02K 7/116* (2006.01)
- *H02K 15/16* (2006.01)
- *F16H 57/02* (2012.01)

(52) U.S. Cl.
CPC ..... *H02K 15/165* (2013.01); *F16H 2049/003* (2013.01); *F16H 2057/02073* (2013.01)

(58) Field of Classification Search
CPC .......... F16H 1/32; H02K 7/075; H02K 7/116; H02K 15/165
See application file for complete search history.

(56) References Cited

U.S. PATENT DOCUMENTS

| | | | |
|---|---|---|---|
| 4,271,726 A * | 6/1981 | Ryffel | F16H 1/32 418/61.3 |
| 4,282,777 A * | 8/1981 | Ryffel | F16H 1/32 418/61.3 |
| 4,487,091 A | 12/1984 | Pierrat | |
| 5,820,504 A * | 10/1998 | Geralde | F16H 1/32 475/180 |
| 8,857,546 B2 | 10/2014 | Yamamoto | |
| 9,752,653 B1 | 9/2017 | Yao | |
| 9,783,262 B2 | 10/2017 | Dubose | |
| 2008/0007130 A1 | 1/2008 | Edelson | |
| 2009/0044651 A1 | 2/2009 | Yamamori et al. | |
| 2009/0058208 A1 | 3/2009 | Kimura et al. | |
| 2012/0326573 A1 | 12/2012 | Yamamoto et al. | |
| 2013/0099554 A1 | 4/2013 | Lee | |
| 2013/0257202 A1 | 10/2013 | Takuno et al. | |
| 2020/0144888 A1 | 5/2020 | Chung et al. | |

FOREIGN PATENT DOCUMENTS

| | | | | |
|---|---|---|---|---|
| CN | 205331325 U | 6/2016 | | |
| CN | 105743276 A | 7/2016 | | |
| CN | 108468758 A | 8/2018 | | |
| CN | 208041059 U | 11/2018 | | |
| EP | 3399211 A1 * | 11/2018 | ............... | F16H 1/32 |
| JP | 2006217779 A | 8/2006 | | |
| TW | M371813 U | 1/2010 | | |
| TW | I431209 B | 3/2014 | | |
| TW | M512259 U | 11/2015 | | |
| TW | I584998 B | 6/2017 | | |
| TW | 201831806 A | 9/2018 | | |
| WO | 9710452 A1 | 3/1997 | | |

\* cited by examiner

SPEED REDUCER

CROSS-REFERENCE TO RELATED APPLICATION

This application is a Divisional application of U.S. patent application Ser. No. 16/585,474 filed on Sep. 27, 2019 and entitled "SPEED REDUCER", which claims the benefit of U.S. Provisional Application No. 62/756,706 filed on Nov. 7, 2018 and claims the priority to Chinese Patent Application No. 201910250209.6 filed on Mar. 29, 2019. The entire contents of the above-mentioned patent applications are incorporated herein by reference for all purposes.

FIELD OF THE INVENTION

The present invention relates to a speed reducer, and more particularly to a cycloid speed reducer with the benefits of a rotary vector (RV) reducer and a harmonic drive reducer and capable of achieving the high reduction ratio.

BACKGROUND OF THE INVENTION

Generally, a motor is operated at a high speed and a low torsion force. In other words, it is difficult for the motor to drive a large-sized load. For allowing the motor to drive a heavy object, a speed reducer is used for reducing the rotating speed of the motor and increasing the torsion force.

Conventionally, the speed reducers are classified into several types, including RV reducers, harmonic drive reducers and cycloid speed reducers. For example, the RV-E series reducer is a two-stage speed reducer produced by Nabtesco. The RV-E series reducer comprises a first speed reduction stage with a spur gear reduction mechanism and a second speed reduction stage with a differential gear reduction mechanism. The gears of the first speed reduction stage and the second speed reduction stage are made of metallic material. The RV-E series reducer is a two-stage reduction design to reduce vibration and inertia while increasing the reduction ratio. The RV-E series reducer provides high-end performance in highly rigidity and high reduction ratio configurations, and the rolling contact elements of the RV-E series reducer have high efficiency and long life. However, since the RV-E series reducer has larger volume and weight and has many components to be assembled, the cost of the RV-E series reducer is high.

The harmonic drive reducer comprises a wave generator, a flexible element (e.g., a flexible spline) and a rigid gear. The elastic deformation of the flexible element can be controlled to result in a pushing action so as to transmit motion and power of mechanical transmission. The harmonic drive reducer has smaller size, lighter weight and higher precision when compared with the RV reducer. However, since the rigidity of the flexible element of the harmonic drive reducer is lower than the metallic element, the harmonic drive reducer is unable to withstand high impact and has a problem of causing teeth difference friction. In other words, the use life of the harmonic drive reducer is shorter. Moreover, since the input speed of the harmonic drive reducer is not high and limited, the reduction ratio of the harmonic drive reducer is lower.

Conventionally, a cycloid speed reducer comprises an eccentric shaft and two cycloid wheels. Each of the two cycloid wheels comprises a plurality of teeth. Moreover, the two cycloid wheels are linked with a power input shaft and a power output shaft, respectively. During operations of the cycloid speed reducer, one cycloid wheel is rotated with the power input shaft through the eccentric shaft, and the power output shaft is rotated with the other cycloid wheel. Through the corresponding teeth, the two cycloid wheels are correspondingly rotated. The conventional cycloid speed reducer has many benefits such as high transmission ratio, compact structure, high loading capability and high transmission efficiency. However, the conventional cycloid speed reducer still has some drawbacks. For forming the teeth, it is necessary to form a concave structure in a surface of the main body of the cycloid wheel. Then, the concave structure is machined to form inner teeth. As known, it is difficult to machine the teeth.

For overcoming the above drawbacks, there is a need of providing a cycloid speed reducer with the characteristics of a RV reducer and a harmonic drive reducer and capable of achieving high reduction ratio. Moreover, the teeth can be machined more easily.

SUMMARY OF THE INVENTION

An object of the present invention provides a speed reducer. By the speed reducer of the present invention, the problems of the conventional RV reducer (e.g., high volume, weight and cost) and the problems of the conventional harmonic drive reducer (e.g., unable to withstand high impact, the teeth difference friction problem and the low reduction ratio) will be overcome. Moreover, when compared with the conventional cycloid speed reducer, the teeth of the speed reducer of the present invention can be machined more easily.

In accordance with an aspect of the present invention, a speed reducer is provided. The speed reducer comprises a transmission shaft, an eccentric wheel, a first wheel assembly, a rotating wheel and a second wheel assembly. The transmission shaft has a first end and a second end. The eccentric wheel is eccentrically fixed on the second end of the transmission shaft, and the eccentric wheel is driven by the transmission shaft to eccentrically rotate relative to an axle center of the transmission shaft. The first wheel assembly comprises a first wheel disc and at least one first roller. The first wheel disc is disposed between the first end and the second end of the transmission shaft and comprises a first annular body. The first annular body is extended from the first wheel disc in a direction away from the first end of the transmission shaft. The first annular body has an inner wall. The at least one first roller is disposed on the inner wall. The rotating wheel comprises a main body and an axle hole. The eccentric wheel is disposed within the axle hole. The rotating wheel is rotated with the eccentric wheel. The main body comprises an outer ring structure and a concave structure. The outer ring structure is disposed on an outer periphery of the main body and comprises at least one first tooth. The at least one first tooth is in contact with the corresponding first roller. At least one second roller is disposed within the concave structure. The second wheel assembly comprises a second wheel disc and at least one second tooth. The second wheel disc comprises a second annular body. The second annular body is extended from the second wheel disc in a direction toward the first end of the transmission shaft. The at least one second tooth is disposed on an outer periphery of the second annular body. Each of the at least one second tooth is in contact with the corresponding second roller.

In accordance with another aspect of the present invention, a speed reducer is provided. The speed reducer comprises a transmission shaft, an eccentric wheel, a first wheel assembly, a rotating wheel and a second wheel assembly. The transmission shaft has a first end and a second end. The eccentric wheel is eccentrically fixed on the second end of the transmission shaft, and the eccentric wheel is driven by the transmission shaft to eccentrically rotate relative to an axle center of the transmission shaft. The first wheel assembly comprises a first wheel disc. The first wheel disc comprises a first annular body and at least one first tooth. The first wheel disc is disposed between the first end and the second end of the transmission shaft. The first annular body is extended from the first wheel disc in a direction away from the first end of the transmission shaft. The first annular body has an inner wall. The at least one tooth is disposed on the inner wall. The rotating wheel comprises a main body and an axle hole. The eccentric wheel is disposed within the axle hole. The rotating wheel is rotated with the eccentric wheel. The main body comprises an outer ring structure and a concave structure. The outer ring structure is disposed on an outer periphery of the main body and comprises at least one first roller. The at least one first tooth is in contact with the corresponding first roller. At least one second roller is disposed within the concave structure. The second wheel assembly comprises a second wheel disc. The second wheel disc comprises a second annular body and at least one second tooth, and the second annular body is extended from the second wheel disc in a direction toward the first end of the transmission shaft. The at least one second tooth is disposed on an outer periphery of the second annular body. Each of the at least one second tooth is in contact with the corresponding second roller.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
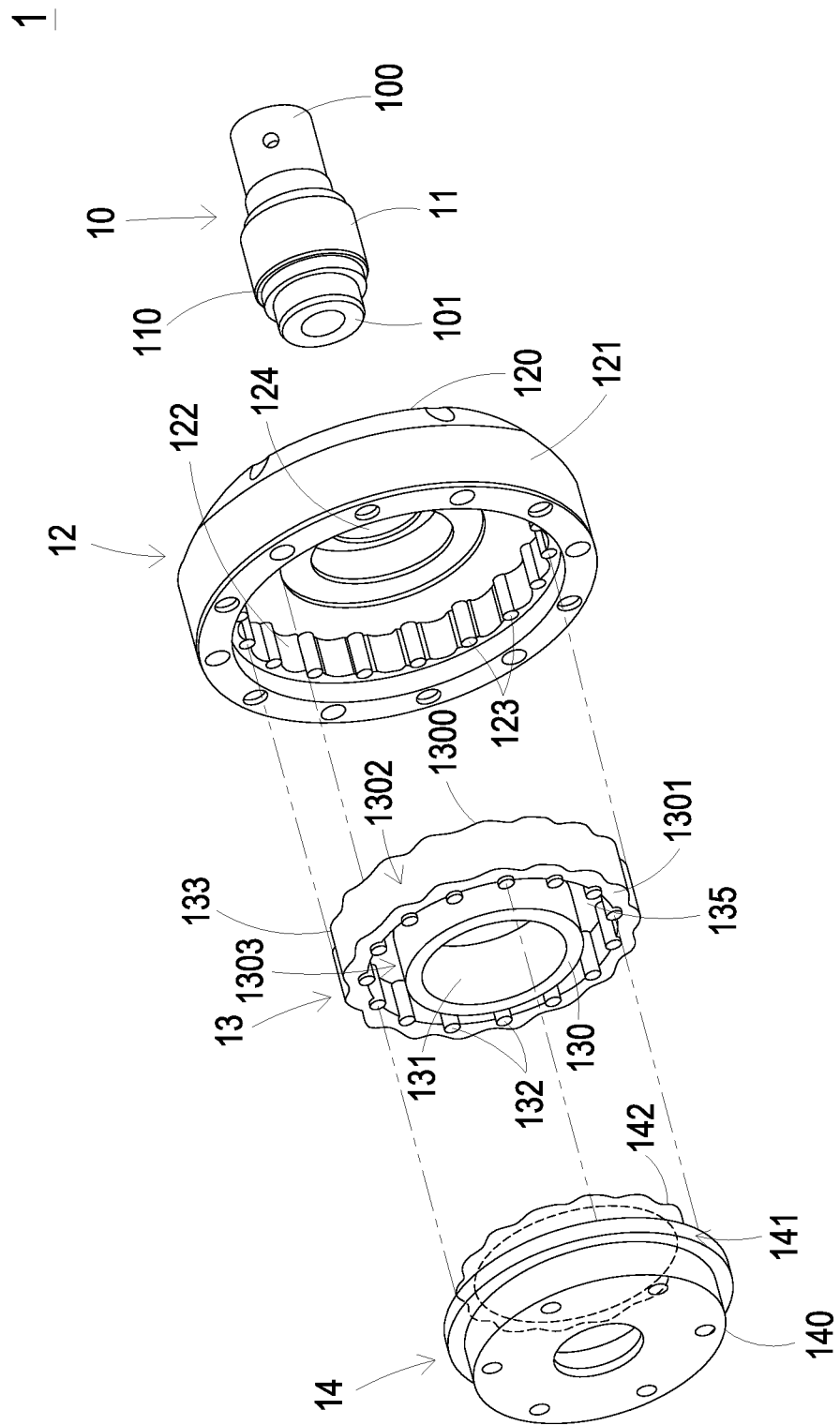
FIG. 1A is a schematic exploded view illustrating a speed reducer according to a first embodiment of the present invention.
Figure 1B:
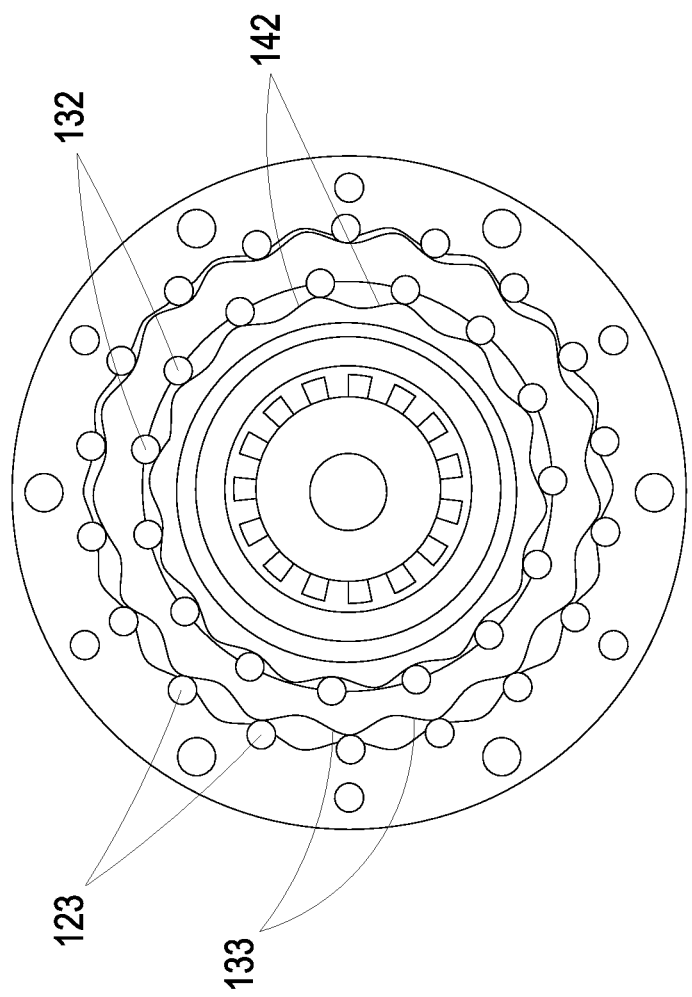
FIG. 1B is a schematic cross-sectional view illustrating the speed reducer as shown in FIG. 1A.
Figure 2A:
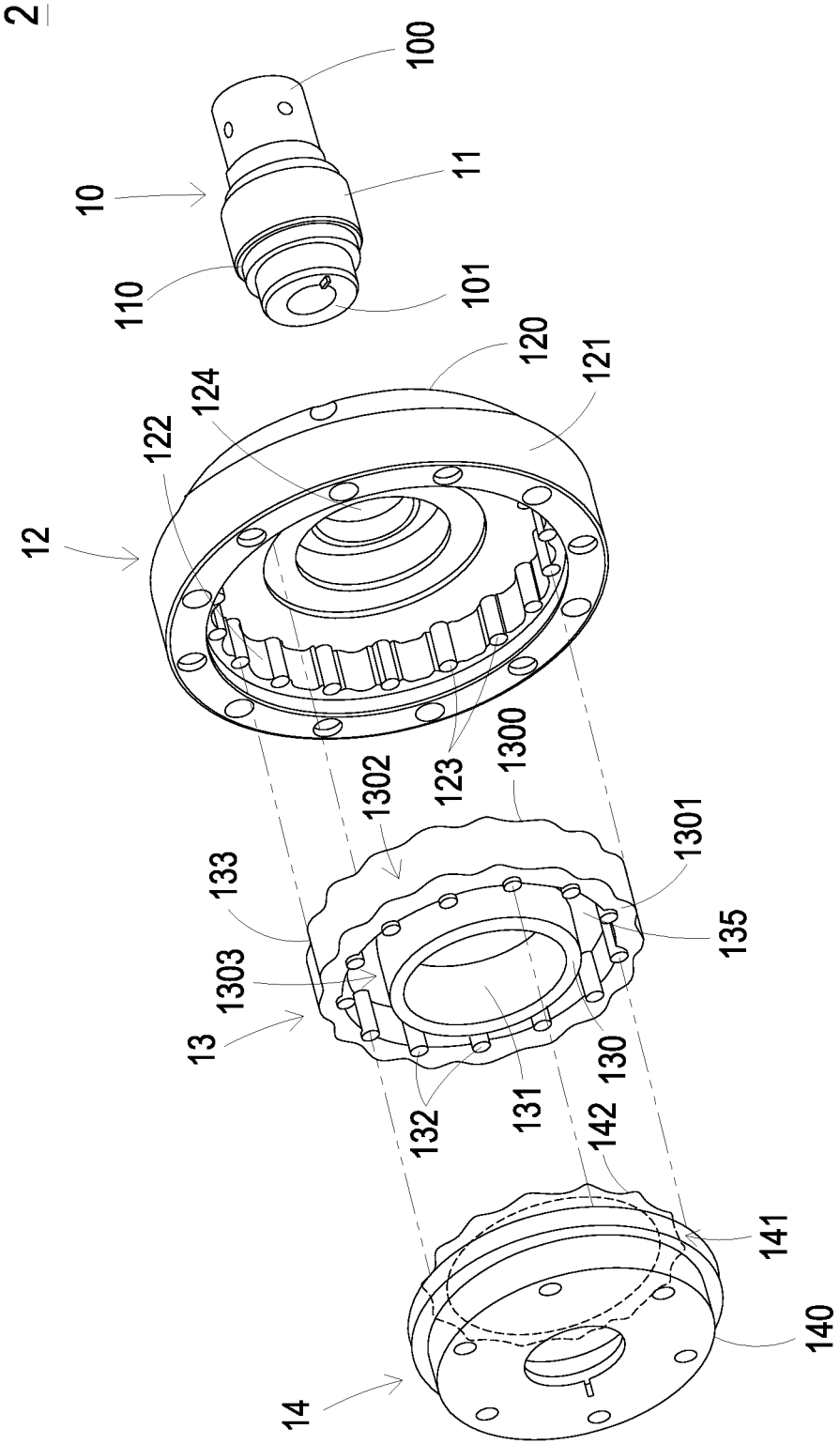
FIG. 2A is a schematic exploded view illustrating a speed reducer according to a second embodiment of the present invention.
Figure 2B:
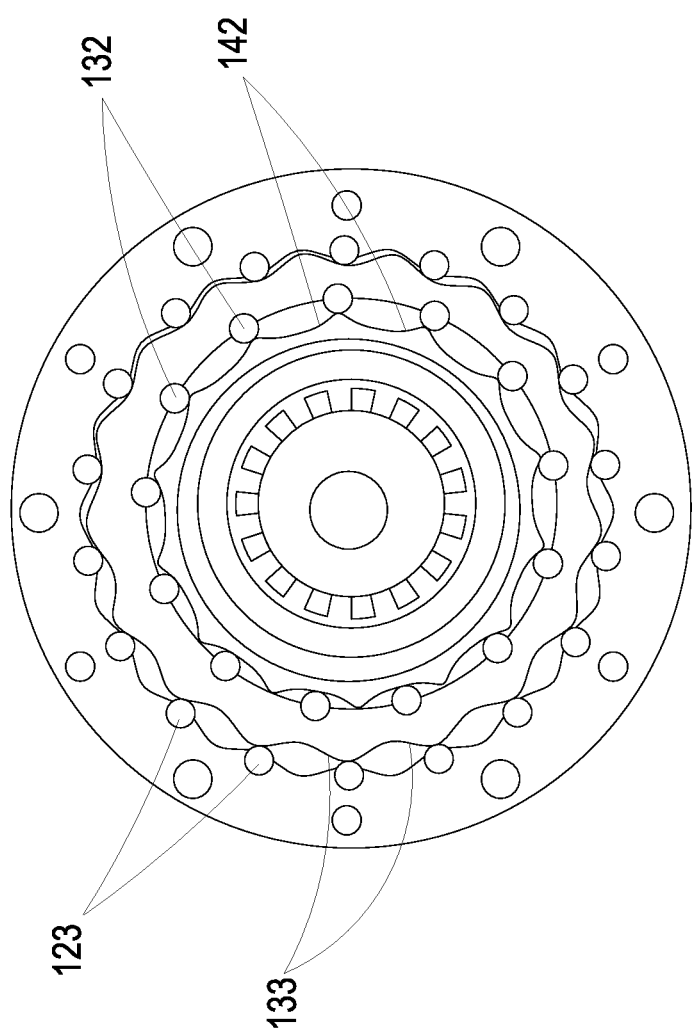
FIG. 2B is a schematic cross-sectional view illustrating the speed reducer as shown in FIG. 2A.
Figure 3A:
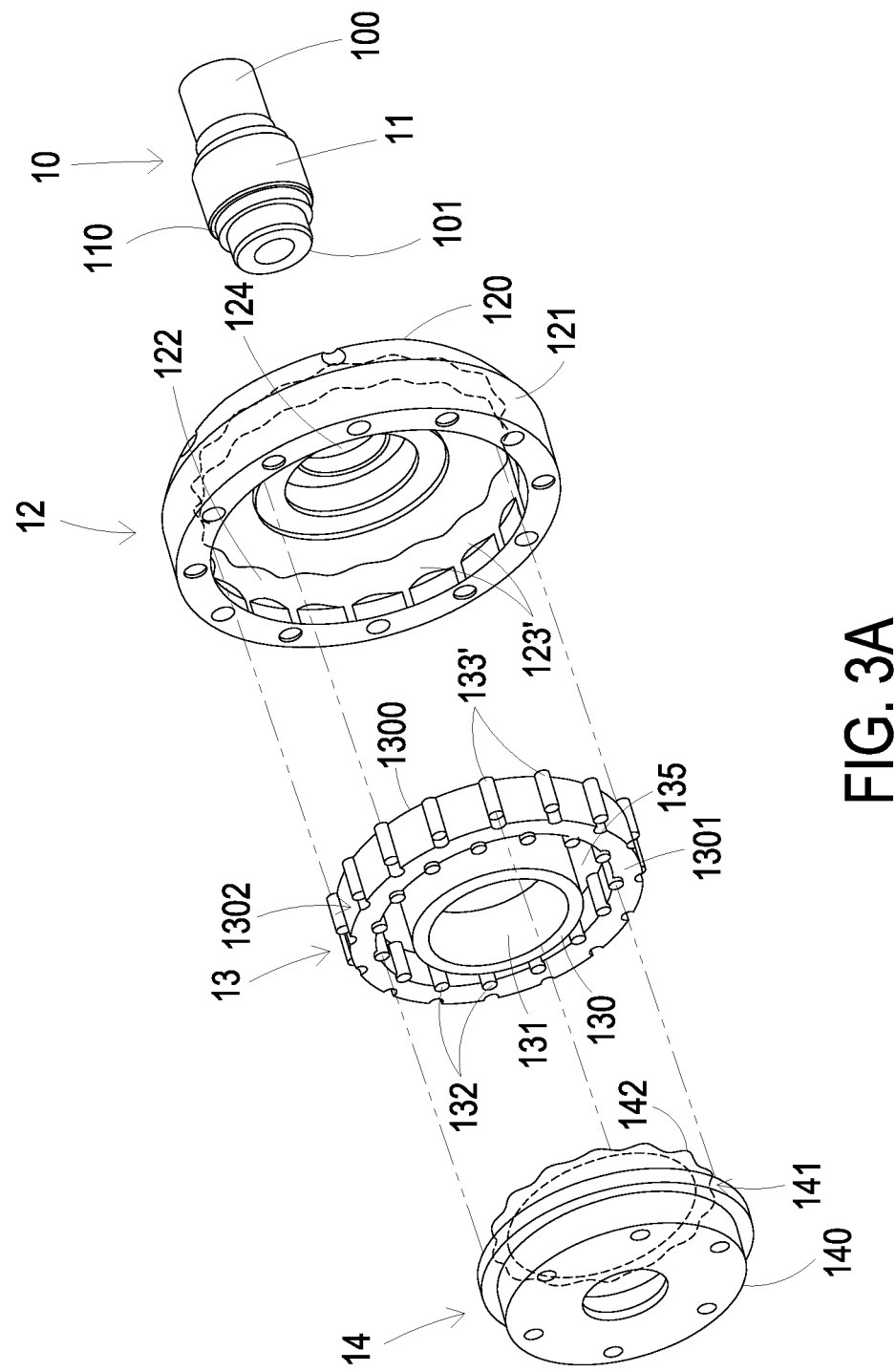
FIG. 3A is a schematic exploded view illustrating a speed reducer according to a third embodiment of the present invention.
Figure 3B:
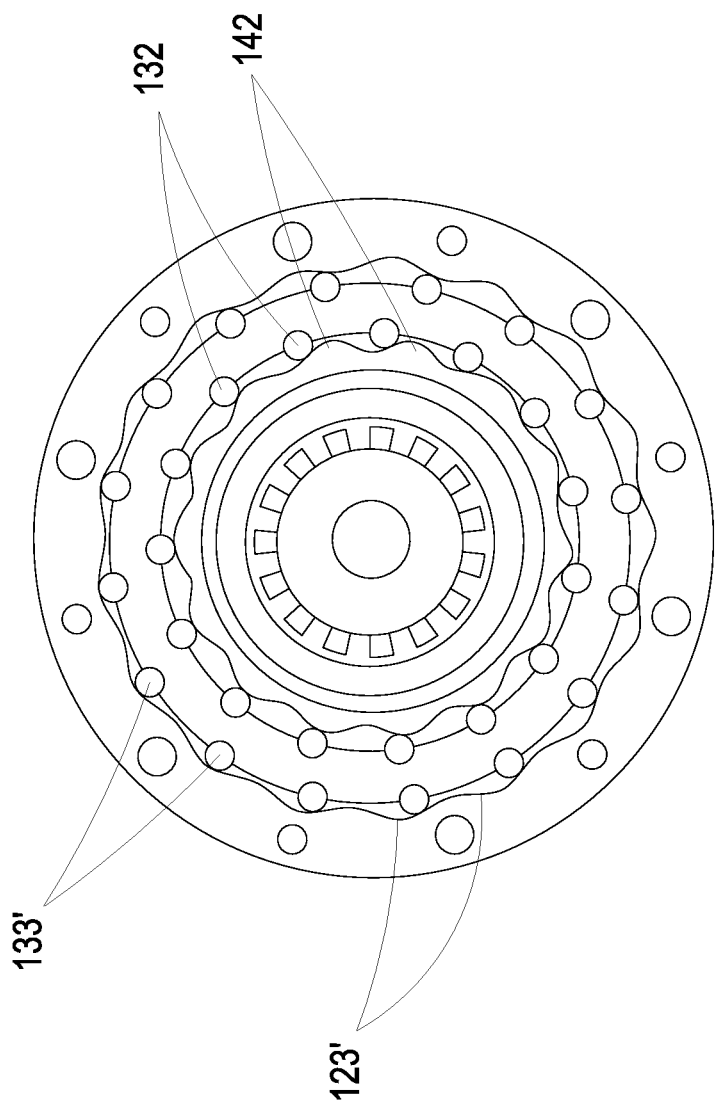
FIG. 3B is a schematic cross-sectional view illustrating the speed reducer as shown in FIG. 3A.
Figure 4A:
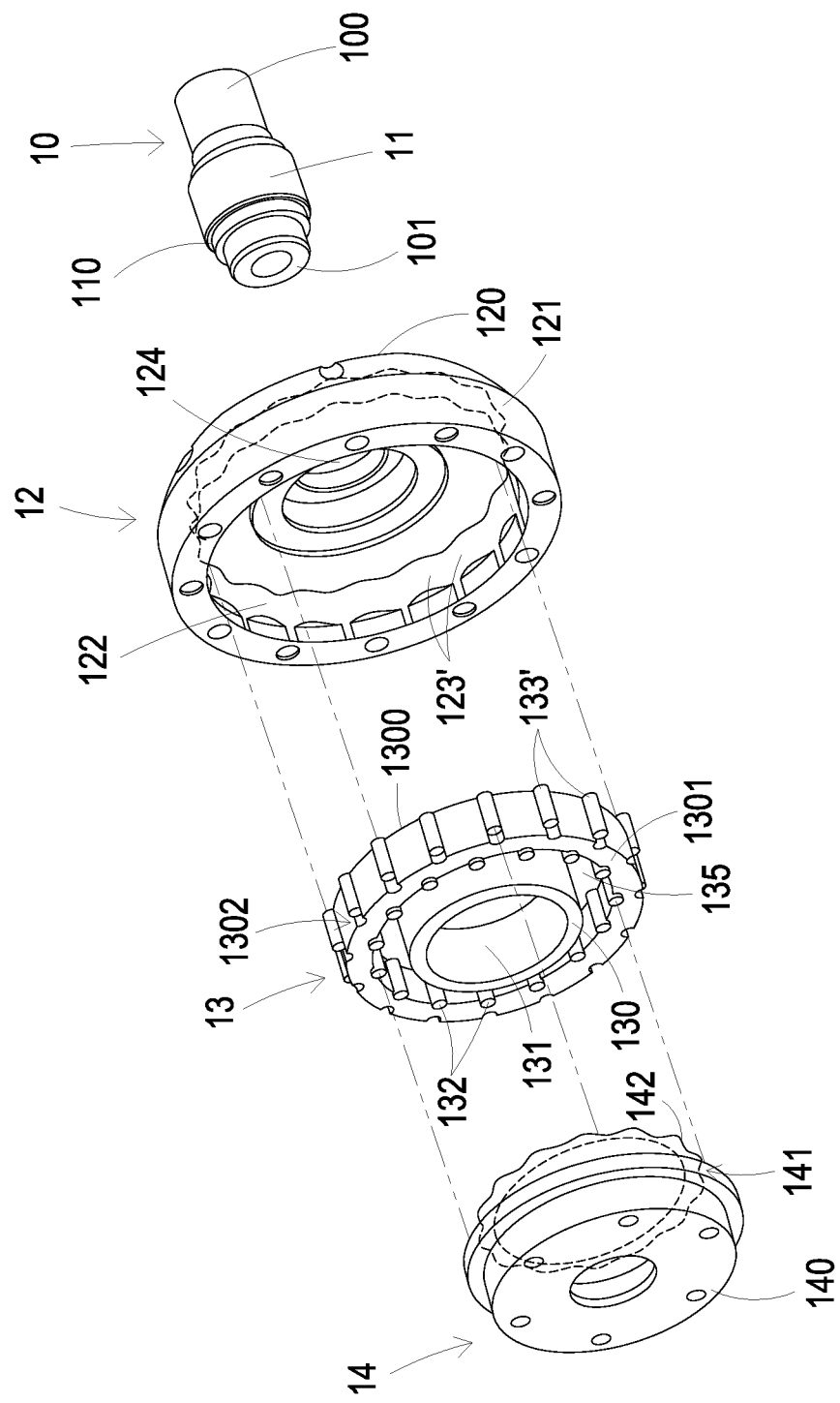
FIG. 4A is a schematic exploded view illustrating a speed reducer according to a fourth embodiment of the present invention.
Figure 4B:
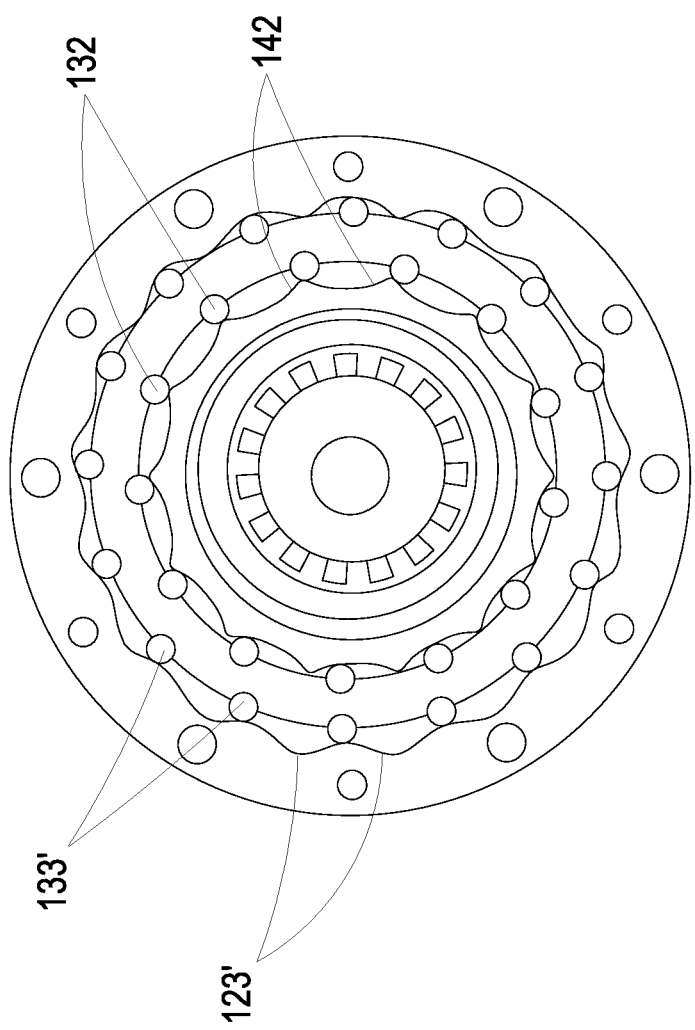
FIG. 4B is a schematic cross-sectional view illustrating the speed reducer as shown in FIG. 4A.

The present invention provides a speed reducer. Hereinafter, four embodiments of the speed reducer will be described. The first embodiment of the speed reducer is shown in FIGS. 1A and 1B. The second embodiment of the speed reducer is shown in FIGS. 2A and 2B. The third embodiment of the speed reducer is shown in FIGS. 3A and 3B. The fourth embodiment of the speed reducer is shown in FIGS. 4A and 4B. The structures and operations of the speed reducers 1, 2, 3 and 4 of the four embodiments are similar to each other. The differences among the speed reducers 1, 2, 3 and 4 of the four embodiments substantially lie in that the rollers or the teeth are disposed on the inner wall of the first wheel assembly, the rollers or the teeth are disposed on the outer ring structure of the rotating wheel, and the number of the teeth and the number of the rollers. The detailed structures of the speed reducer 1 of the first embodiment of FIGS. 1A and 1B are described as below. As for the second embodiment, the third embodiment and the fourth embodiment, the elements and features indicated by the numerals similar to those of the first embodiment of FIGS. 1A to 1B mean similar elements and features, and are not redundantly described herein. Only the differences among the four embodiments are described in the corresponding paragraphs.

Please refer to FIGS. 1A and 1B. FIG. 1A is a schematic exploded view illustrating a speed reducer according to a first embodiment of the present invention. FIG. 1B is a schematic cross-sectional view illustrating the speed reducer as shown in FIG. 1A. The speed reducer 1 can be applied to motors, machine tools, robotic arms, automobiles, motorcycles or other motive machines in order to provide a speed reducing function.

In this embodiment, the speed reducer 1 is a two-stage cycloid speed reducer. The speed reducer 1 comprises a transmission shaft 10, an eccentric wheel 11, a first wheel assembly 12, a rotating wheel 13 and a second wheel assembly 14.

The transmission shaft 10 has a first end 100 and a second end 101. The first end 100 is a power input end for receiving an input power from a motor (not shown). Moreover, the eccentric wheel 11 has an eccentric hole 110. The geometric center of the eccentric hole 110 is deviated from the geometric center of the eccentric wheel 11. The second end 101 of the transmission shaft 10 is penetrated through the eccentric hole 110. Consequently, the eccentric wheel 11 is eccentrically fixed on the second end 101 of the transmission shaft 10. When the input power received by the first end 100 of the transmission shaft 10 to result in rotation of the transmission shaft 10, the eccentric wheel 11 is driven by the second end 101 of the transmission shaft 10. Consequently, the eccentric wheel 11 is eccentrically rotated relative to an axle center of the transmission shaft 10.

The first wheel assembly 12 comprises a first wheel disc 120 and at least one first roller 123. A central hole 124 is formed at the geometric center of the first wheel disc 120. Moreover, a bearing (not shown) is disposed within the central hole 124 of the first wheel disc 120. An example of the bearing comprises but is not limited to a ball bearing, a needle bearing or an oil-retaining bearing. The second end 101 of the transmission shaft 10 is penetrated through the bearing that is disposed within the central hole 124 of first wheel disc 120. Consequently, the first end 100 and the second end 101 of the transmission shaft 10 are located at two opposite sides of the first wheel disc 120. In addition, the first wheel disc 120 further comprises a first annular body 121. The first annular body 121 is extended from the first wheel disc 120 in the direction away from the first end 100 of the transmission shaft 10 (i.e., in the direction toward the rotating wheel 13). Consequently, the first annular body 121 is a hollow structure. The first annular body 121 has an inner wall 122. The at least one first roller 123 is disposed on the inner wall 122. The first wheel assembly 12 may be rotated about the axel center of the transmission shaft 10 or not rotated. In case that the first wheel assembly 12 is rotated, the first wheel disc 120 and the at least one first roller 123 are rotated about the axel center of the transmission shaft 10.

At least a portion of the rotating wheel 13 is accommodated within a hollow space of the first annular body 121. In this embodiment, the rotating wheel 13 comprises a main body 130 and an axle hole 131. The axle hole 131 is located at the geometric center of the main body 130. The bearing (not shown) is disposed within the axle hole 131. Consequently, the eccentric wheel 11 is rotatably disposed within the axle hole 131 of the rotating wheel 13 through the bearing. Consequently, when the eccentric wheel 11 is rotated, the rotating wheel 13 is synchronously rotated with the eccentric wheel 11. The main body 130 comprises a first surface 1300, a second surface 1301, an outer ring structure 1302 and a concave structure 1303. The first surface 1300 and the second surface 1301 are opposed to each other. The first surface 1300 is arranged beside the first wheel assembly 12. The second surface 1301 is arranged beside the second wheel assembly 14.

The outer ring structure 1302 is disposed on an outer periphery of the main body 130. The outer ring structure 1302 comprises at least one first tooth 133. The at least one first tooth 133 is in contact with the corresponding first roller 123. The concave structure 1303 is concavely formed in the second surface 1301 of the main body 130. The concave structure 1303 comprises at least one second roller 132. At least a portion of the second roller 132 is accommodated within the concave structure 1303. Moreover, since at least a portion of the main body 130 comprises the concave structure 1303, the other region of the main body 130, for example the region between the concave structure 1303 and the outer ring structure 1302, is defined as a wall region with thicker thickness.

The second wheel assembly 14 comprises a second wheel disc 140 and at least one second tooth 142. The second wheel disc 140 comprises a second annular body 141. The second annular body 141 is extended in the direction toward the first end 100 of the transmission shaft 10. The at least one second tooth 142 is circumferentially arranged on the outer periphery of the second annular body 141. That is, the second tooth 142 is an outer tooth having a blunt teeth profile, a wavy profile or a petal profile. The at least one second tooth 142 is partially accommodated within the concave structure 1303 and is in contact with the corresponding second roller 132.

In an embodiment, the first wheel assembly 12 comprises a plurality of first rollers 123. The plurality of first rollers 123 are circumferentially and discretely arranged on the inner wall 122 of the first annular body 121 at regular intervals. The rotating wheel 13 comprises a plurality of first teeth 133. The plurality of first teeth 133 are circumferentially and discretely arranged on the outer ring structure 1302 formed on the outer periphery of the main body 130. The plurality of first rollers 123 are in contact with the corresponding first teeth 133. The first teeth 133 are outer teeth formed on the outer periphery of the main body 130. Due to the first teeth 133, the main body 130 has a blunt teeth profile, a wavy profile or a petal profile.

In some embodiments, the second wheel assembly 14 may be rotated or not rotated. In case that the second wheel assembly 14 is rotated and the rotating wheel 13 is synchronously rotated with the eccentric wheel 11, the second teeth 142 and the corresponding second rollers 132 are pushed against each other and the second wheel disc 140 is rotated. Consequently, the second wheel assembly 14 is rotated about its axel center. When the first wheel assembly 12 is rotated about the axel center of the transmission shaft 10, the second wheel assembly 14 is not rotated. When the first wheel assembly 12 is not rotated, the second wheel assembly 14 is rotated about the axel center thereof.

In this embodiment, the number of the second rollers 132 is one greater than the number of the second teeth 142, and the number of the first rollers 123 is one greater than the number of the first teeth 133 (see FIG. 1B). For example, in case that the number of the first teeth 133 is M and the number of the second teeth 142 is N, the number of the first rollers 123 is equal to (M+1) and the number of the second rollers 132 is equal to (N+1).

According to the rotating conditions of the first wheel assembly 12 and the second wheel assembly 14, the speed reducer 1 of the present invention can be designed to have two operating situations with different reduction ratios. In a first operating situation, M+1 first rollers 123 are not rotated relative to the axle center of the transmission shaft 10 (i.e. the first wheel assembly 12 is not rotated), but N second teeth 142 are driven to rotate as the rotating wheel 13 is rotated (i.e. the second wheel assembly 14 is rotated). The reduction ratio of the speed reducer 1 is equal to $(M \times N)/\{M \times N-(M+1) \times (N+1)\}$, wherein M and N are integers greater than 1. Meanwhile, the second wheel assembly 14 is the power output end. In a second operating situation, N second teeth 142 are not rotated (i.e. the second wheel assembly 14 is not rotated), but M+1 first rollers 123 are driven to rotate relative to the axle center of the transmission shaft 10 as the rotating wheel 13 is rotated (i.e. the first wheel assembly 12 is rotated). The reduction ratio of the speed reducer 1 is equal to $\{(M+1) \times (N+1)\}/\{(M+1) \times (N+1)-(M \times N)\}$. Meanwhile, the first wheel assembly 12 is the power output end.

From the above descriptions, the present invention provides the speed reducer 1. The rotating wheel 13 comprises at least one first tooth 133 and at least one second roller 132. The at least one first tooth 133 is in contact with the corresponding first roller 123 of the first wheel assembly 12. The at least one second roller 132 is in contact with the corresponding second tooth 142 of the second wheel assembly 14. The pushing action of the speed reducer 1 of the present invention is similar to that of the conventional harmonic drive reducer. Consequently, the speed reducer 1 of the present invention has simplified structure and less number of components, and is easily assembled and cost-effective. Due to the concave structure 1303 of the rotating wheel 13, the thickness, volume and weight of the overall speed reducer 1 are reduced. Moreover, due to the wall region of the rotating wheel 13, the overall rigidity of the speed reducer 1 is increased to withstand high impact, and the use life of the speed reducer 1 is prolonged. In other words, the speed reducer 1 of the present invention has the benefits of a RV reducer and a harmonic drive reducer. Moreover, the speed reducer 1 of the present invention can provide a high reduction ratio. Since the second teeth 142 of the second wheel assembly 14 are formed as the outer teeth on the outer periphery of the second annular body 141, the second teeth 142 can be machined more easily.

Please refer to FIGS. 2A and 2B. FIG. 2A is a schematic exploded view illustrating a speed reducer according to a second embodiment of the present invention. FIG. 2B is a schematic cross-sectional view illustrating the speed reducer as shown in FIG. 2A. In the speed reducer 2 of this embodiment, the number of the second teeth 142 is one greater than the number of the second rollers 132, and the number of the first rollers 123 is one greater than the number of the first teeth 133 (see FIG. 2B). For example, in case that the number of the first teeth 133 is M and the number of the second teeth 142 is N, the number of the first rollers 123 is equal to (M+1) and the number of the second rollers 132 is equal to (N−1).

According to the rotating conditions of the first wheel assembly 12 and the second wheel assembly 14, the speed reducer 2 of the present invention can be designed to have two operating situations with different reduction ratios. In a first operating situation, M+1 first rollers 123 are not rotated relative to the axle center of the transmission shaft 10 (i.e. the first wheel assembly 12 is not rotated), but N second teeth 142 are driven to rotate as the rotating wheel 13 is rotated (i.e. the second wheel assembly 14 is rotated). The reduction ratio of the speed reducer 2 is equal to (M×N)/{M×N−(M+1)×(N−1)}, wherein M and N are integers greater than 1. Meanwhile, the second wheel assembly 14 is the power output end. In a second operating situation, N second teeth 142 are not rotated (i.e. the second wheel assembly 14 is not rotated), but M+1 first rollers 123 are driven to rotate relative to the axle center of the transmission shaft 10 as the rotating wheel 13 is rotated (i.e. the first wheel assembly 12 is rotated). The reduction ratio of the speed reducer 2 is equal to {(M+1)×(N−1)}/{(M+1)×(N−1)−(M×N)}. Meanwhile, the first wheel assembly 12 is the power output end.

Please refer to FIGS. 3A and 3B. FIG. 3A is a schematic exploded view illustrating a speed reducer according to a third embodiment of the present invention. FIG. 3B is a schematic cross-sectional view illustrating the speed reducer as shown in FIG. 3A. Comparing the speed reducer 3 of this embodiment with the speed reducer 1 of the first embodiment as shown in FIGS. 1A and 1B, the first rollers 123 disposed on the inner wall 122 of the first wheel assembly 12 are replaced by first teeth 123', and the first teeth 133 of the outer ring structure 1302 are replaced by first rollers 133'. The first teeth 123' are circumferentially and discretely arranged on the inner wall 122 of the first annular body 121 at regular intervals. The first rollers 133' are circumferentially and discretely arranged on the outer ring structure 1302 of the main body 130. The first teeth 123' are in contact with the corresponding first rollers 133'. In the speed reducer 3 of this embodiment, the number of the second teeth 142 is one less than the number of the second rollers 132, and the number of the first rollers 133' is one less than the number of the first teeth 123' (see FIG. 3B). For example, in case that the number of the first teeth 123' is M and the number of the second teeth 142 is N, the number of the first rollers 133' is equal to (M−1) and the number of the second rollers 132 is equal to (N+1).

According to the rotating conditions of the first wheel assembly 12 and the second wheel assembly 14, the speed reducer 3 of the present invention can be designed to have two operating situations with different reduction ratios. In a first operating situation, M first teeth 123' are not rotated (i.e. the first wheel assembly 12 is not rotated), but N second teeth 142 are driven to rotate as the rotating wheel 13 is rotated (i.e. the second wheel assembly 14 is rotated). The reduction ratio of the speed reducer 3 is equal to {(M−1)×N}/{(M−1)×N−(M)×(N+1)}, wherein M and N are integers greater than 1. Meanwhile, the second wheel assembly 14 is the power output end. In a second operating situation, N second teeth 142 are not rotated (i.e. the second wheel assembly 14 is not rotated), but M first teeth 123' are driven to rotate as the rotating wheel 13 is rotated (i.e. the first wheel assembly 12 is rotated). The reduction ratio of the speed reducer 3 is equal to {(M)×(N+1)}/{(M)×(N+1)−(M−1)×N}. Meanwhile, the first wheel assembly 12 is the power output end.

FIG. 4A is a schematic exploded view illustrating a speed reducer according to a fourth embodiment of the present invention. FIG. 4B is a schematic cross-sectional view illustrating the speed reducer as shown in FIG. 4A. Comparing the speed reducer 4 of this embodiment with the speed reducer 3 of the third embodiment as shown in FIGS. 3A and 3B, the number of first rollers 133' is one less than the number of the first teeth 123', and the number of the second teeth 142 is one greater than the number of the second rollers 132 (see FIG. 4B). For example, in case that the number of the first teeth 123' is M and the number of the second teeth 142 is N, the number of the first rollers 133' is equal to (M−1) and the number of the second rollers 132 is equal to (N−1).

According to the rotating conditions of the first wheel assembly 12 and the second wheel assembly 14, the speed reducer 4 of the present invention can be designed to have two operating situations with different reduction ratios. In a first operating situation, M first teeth 123' are not rotated (i.e. the first wheel assembly 12 is not rotated), but N second teeth 142 are driven to rotate as the rotating wheel 13 is rotated (i.e. the second wheel assembly 14 is rotated). The reduction ratio of the speed reducer 4 is equal to {(M−1)×N}/{(M−1)×N−(N−1)×(M)}, wherein M and N are integers greater than 1. Meanwhile, the second wheel assembly 14 is the power output end. In a second operating situation, N second teeth 142 are not rotated (i.e. the second wheel assembly 14 is not rotated), but M first teeth 123' are driven to rotate as the rotating wheel 13 is rotated (i.e. the first wheel assembly 12 is rotated). The reduction ratio of the speed reducer 4 is equal to {(M)×(N−1)}/{(M)×(N−1)−(M−1)×N}. Meanwhile, the first wheel assembly 12 is the power output end.

From the above descriptions, the present invention provides a speed reducer. The at least one first tooth is in contact with the corresponding first roller. The at least one second roller is in contact with the corresponding second tooth. The rotating wheel, the first wheel assembly and the second wheel assembly cooperate with each other. The pushing action of the speed reducer of the present invention is similar to that of the conventional harmonic drive reducer. Consequently, the speed reducer of the present invention has simplified structure and less number of components, and is easily assembled and cost-effective. Due to the concave structure of the rotating wheel, the thickness, volume and weight of the overall speed reducer are reduced. Moreover, due to the wall region of the rotating wheel, the overall rigidity of the speed reducer is increased to withstand high impact, and the use life of the speed reducer is prolonged. In other words, the speed reducer of the present invention has the benefits of a RV reducer and a harmonic drive reducer. Moreover, the speed reducer of the present invention can provide a plurality of different high reduction ratios. In addition, in the speed reducer of the present invention, the second teeth of the second wheel assembly are formed as the outer teeth on the outer periphery of the second annular body, and the first tooth of the rotating wheel are formed as the outer teeth on the outer periphery of the outer ring structure of the main body, so that the second teeth and the first teeth formed as the outer teeth can be machined more easily.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed reducer, comprising:
a transmission shaft having a first end and a second end;
an eccentric wheel eccentrically fixed on the second end of the transmission shaft, wherein the eccentric wheel is driven by the transmission shaft to eccentrically rotated relative to an axle center of the transmission shaft;
a first wheel assembly comprising a first wheel disc, wherein the first wheel disc comprises a first annular body and at least one first tooth, the first wheel disc is disposed between the first end and the second end of the transmission shaft, the first annular body is extended from the first wheel disc in a direction away from the first end of the transmission shaft, the first annular body has an inner wall, and the at least one tooth is disposed on the inner wall;
a rotating wheel comprising a main body and an axle hole, wherein the eccentric wheel is disposed within the axle hole, the rotating wheel is rotated with the eccentric wheel, and the main body comprises an outer ring structure and a concave structure, wherein the outer ring structure is disposed on an outer periphery of the main body and comprises at least one first roller, the at least one first tooth is in contact with the corresponding first roller, and at least one second roller is disposed within the concave structure; and
a second wheel assembly comprising a second wheel disc, wherein the second wheel disc comprises a second annular body and at least one second tooth, and the second annular body is extended from the second wheel disc in a direction toward the first end of the transmission shaft, wherein the at least one second tooth is disposed on an outer periphery of the second annular body, and each of the at least one second tooth is in contact with the corresponding second roller;
wherein the number of the at least one first roller is different from the number of the at least one second roller.

2. The speed reducer according to claim 1, wherein when the at least one second roller and the corresponding second tooth are pushed against each other to result in rotation of the second wheel assembly, the first wheel assembly is not rotated, wherein when the at least one first roller and the corresponding first tooth are pushed against each other to result in rotation of the first wheel assembly, the second wheel assembly is not rotated.

3. The speed reducer according to claim 2, wherein the number of the at least one first roller is one less than the number of the at least one first tooth, and the number of the at least one second tooth is one less than the number of the at least one second roller.

4. The speed reducer according to claim 3, wherein when the first wheel assembly is not rotated but the second wheel assembly is rotated, a reduction ratio of the speed reducer is equal to $\{(M-1)\times N\}/\{(M-1)\times N-(M)\times(N+1)\}$, wherein M is the number of the at least one first tooth, N is the number of the at least one second tooth, and M and N are integers greater than 1, wherein the second wheel assembly is a power output end.

5. The speed reducer according to claim 3, wherein when the first wheel assembly is rotated but the second wheel assembly is not rotated, a reduction ratio of the speed reducer is equal to $\{(M)\times(N+1)\}/\{(M)\times(N+1)-(M-1)\times N\}$, wherein M is the number of the at least one first tooth, N is the number of the at least one second tooth, and M and N are integers greater than 1, wherein the first wheel assembly is a power output end.

6. The speed reducer according to claim 2, wherein the number of the at least one first roller is one less than the number of the at least one first tooth, and the number of the at least one second tooth is one greater than the number of the at least one second roller.

7. The speed reducer according to claim 6, wherein when the first wheel assembly is not rotated but the second wheel assembly is rotated, a reduction ratio of the speed reducer is equal to $\{(M-1)\times N\}/\{(M-1)\times N-(N-1)\times(M)\}$, wherein M is the number of the at least one first tooth, N is the number of the at least one second tooth, and M and N are integers greater than 1, wherein the second wheel assembly is a power output end.

8. The speed reducer according to claim 6, wherein when the first wheel assembly is rotated but the second wheel assembly is not rotated, a reduction ratio of the speed reducer is equal to $\{(M)\times(N-1)\}/\{(M)\times(N-1)-(M-1)\times N\}$, wherein M is the number of the at least one first tooth, N is the number of the at least one second tooth, and M and N are integers greater than 1, wherein the first wheel assembly is a power output end.

* * * * *